United States Patent [19]

Cheng

[11] Patent Number: 5,505,471
[45] Date of Patent: Apr. 9, 1996

[54] TROLLEY WITH RETRACTABLE WHEELS

[76] Inventor: Chin-Chang Cheng, No. 20, Lane 327, Sec. 2, Chung Shan Rd., Chung Ho City, Taipei Hsien, Taiwan

[21] Appl. No.: 303,028

[22] Filed: Sep. 8, 1994

[51] Int. Cl.⁶ .................................................. B62B 1/12
[52] U.S. Cl. ........................... 280/30; 280/646; 280/655; 280/47.18; 280/47.29
[58] Field of Search .................................. 280/645, 646, 280/42, 47.29, 47.24, 47.27, 47.25, 30, 655, 47.18; 297/118, 130

[56] References Cited

U.S. PATENT DOCUMENTS

| | | | |
|---|---|---|---|
| 4,793,622 | 12/1988 | Sydlow | 280/646 X |
| 5,024,458 | 6/1991 | Kazmark et al. | 280/47.29 X |
| 5,306,027 | 4/1994 | Cheng | 280/47.29 X |

FOREIGN PATENT DOCUMENTS 1172525  12/1969  United Kingdom ................... 280/646

*Primary Examiner*—Margaret A. Focarino
*Assistant Examiner*—Michael Mar
*Attorney, Agent, or Firm*—Hedman, Gibson & Costigan

[57] ABSTRACT

A trolley comprising a pair of vertical bars, a pair of linking bars, and a wheel assembly operable by the linking bars to pivotally move between an extended and a retracted positions. A movable block slidable on the vertical bars is connected with the linking bars. A positioning plate is fixedly mounted on the movable block and a sliding movement of the movable block relative to the vertical bars is controlled by a biasing unit in cooperation with the positioning plate. A respective compression spring is additionally provided on the vertical bars to facilitate the sliding movement of the movable block when the movable block is released to move.

7 Claims, 3 Drawing Sheets

TROLLEY WITH RETRACTABLE WHEELS

BACKGROUND OF THE INVENTION

The present invention relates to a trolley and, more particularly, to a trolley with retractable wheels for carrying large articles such as a golf bag.

Retractable trolleys are known to comprise a pair of vertical bars forming components of a frame, a wheel assembly including a pair of wheels and a pair of linking bars pivotally connected between the pair of vertical bars and the wheel assembly. Each of the wheels is also pivotally linked to the pair of vertical bars or to the frame. A pivotal movement of the linking bars relative to the pair of vertical bars or to the frame will effectuate a change of the wheel between a retracted position and an extended position.

The Applicant's pending U.S. patent application Ser. No. 08/008,576 now U.S. Pat. No. 5,306,027, discloses such a retractable trolley in which an extended or retracted position of the wheels is achieved by manipulating or folding a pair of levers with respect to a pair of vertical bars. When the wheels are in the extended or lifted position, i.e., the levers are at this same in their upward position in line with the vertical bars, hook and pin are utilized to retain this position. To change the wheels to a retracted position, the hook and pin are disengaged from each other and a folding movement of the levers must be performed manually. In this arrangement, there is a potential danger that the hook and pin may be accessed or manipulated by children so that accidental folding down of the levers might occur. In addition to this, a disadvantage inherent to this kind of design, i.e., the requirement of a pivotal or a folding down movement of the levers relative to the vertical bars, is that a sufficiently large space is necessary to permit a folding movement.

In view of the above, there is a need for a retractable trolley which, in operation, does not involve any folding or pivotal movement of certain elements of the trolley relative to other elements thereof. In accordance with the invention, this need is achieved by a retractable trolley which, during a change of positions between a retracted position and a extended position, a sliding movement is exercised. Moreover, in the present invention, this sliding movement is performed under minimal human intervention and can be controlled in a safe way.

SUMMARY OF THE INVENTION

The present invention provides a trolley with retractable wheels of which the extended or retracted position is achieved by a linearly sliding movement of its components, such as a movable block capable of sliding on a pair of vertical bars.

According to another feature of the invention, a trolley is provided in which the wheels are brought to an extended position under a gravity force acting on the trolley so that no further manual operation is required when the wheels are unlocked and start to extend outwardly.

According to a further feature of the invention, a trolley is provided in which a sliding means slidable on a frame of the trolley to effectuate a pivotal movement of the wheels is controlled so that accidental release or folding down of known devices as might be occurred in prior foldable type trolleys is avoided.

These and various other advantages and features of novelty which characterize the trolley are pointed out with particularity in the claims annexed hereto and forming a part hereof. However, for a better understanding of the invention, its advantages, and the objects obtained by its use, reference should be made to the drawings which form a part hereof, and to the accompanying descriptive matter, in which there is illustrated and described a preferred embodiment of the invention.

DESCRIPTION OF THE PREFERRED EMBODIMENTS

Figure 1:
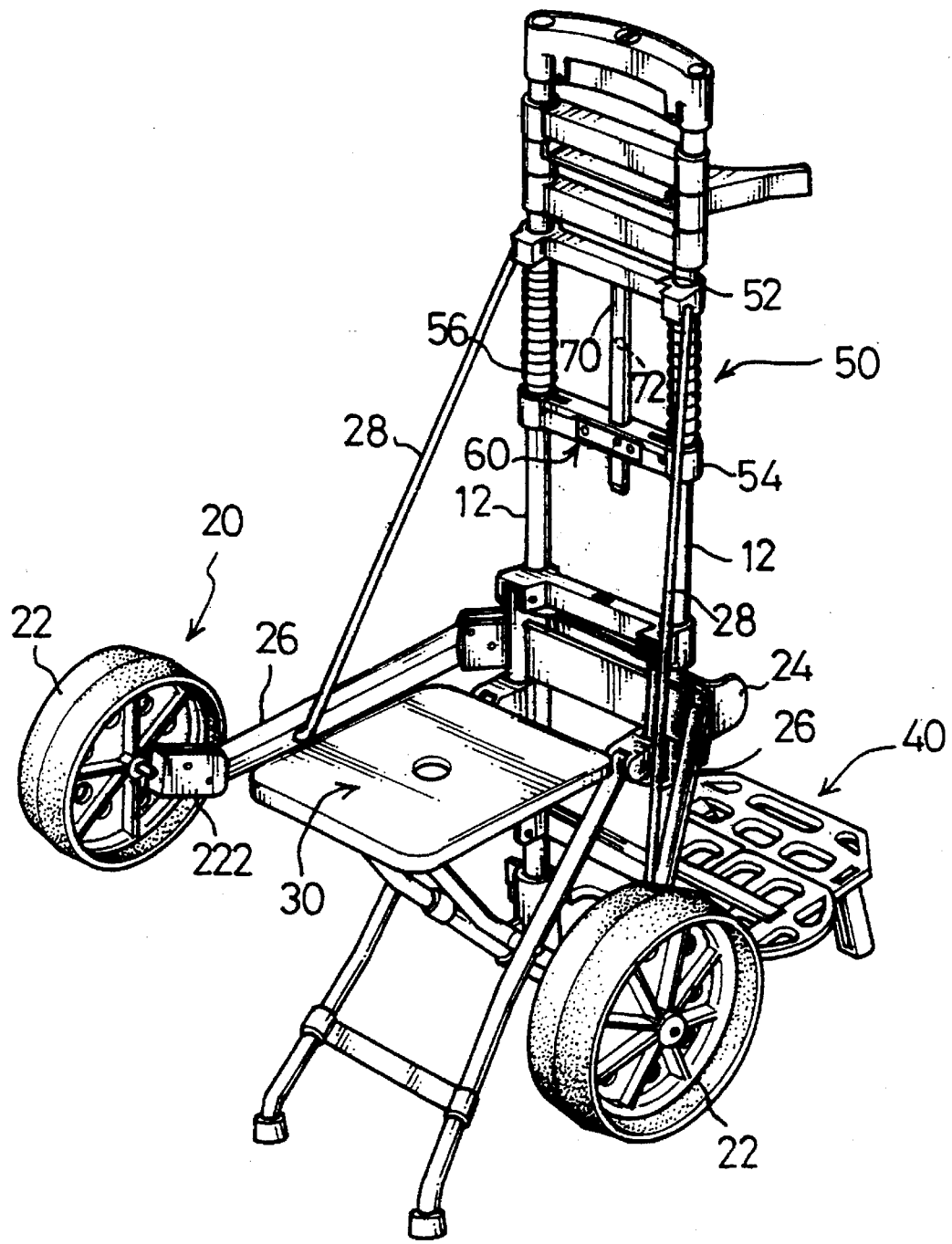
FIG. 1 is a perspective view of a trolley in accordance with the present invention, with the wheels of the trolley shown in an extended position.

Referring to the drawings, and particularly to FIG. 1, a trolley is shown according to a preferred embodiment. The trolley comprises a pair of vertical bars 12 forming a frame thereof. A wheel assembly generally represented by reference numeral 20 is connected to the vertical bars 12 or suitably to the frame of the trolley. The wheel assembly 20 includes a pair of wheels 22, a mount 24 fixed on the vertical bars 12, and a respective linkage 26 pivotally interconnected between a corresponding wheel 22 and the mount 24 by suitable mounting means such as a mount 222. A seat assembly 30 of the same construction as that in the Applicant's above-mentioned pending U.S. application is also shown suitably connected to the frame, as is the supporting means 40 for carrying articles, e.g. a golf bag (not shown). The elements 20, 30 and 40 mentioned thus far are generally not part of the invention or are known in this art so that they will not be further described herein. It is noted that instead of a pair of vertical bars, there can be only a single vertical bar. If so, the relationship that the wheels 22 is capable of a pivotal movement relative to the one vertical bar or to the frame of the trolley still holds without the necessity of any inventive modification being made thereto.

Still referring to FIG. 1, the present invention lies in the provision of an actuation device generally identified by reference numeral 50. The actuation device 50 is connected by a respective linking bar 28 to a corresponding linkage 26. The actuation device 50 comprises a movable block 52, a stationary block 54 and a biasing unit identified by reference numeral 60 in FIG. 1 and best seen in FIG. 3. The movable block 52 is linearly movable along the vertical bars 12 and is pivotally connected with the linking bars 28 so that a sliding movement of the block 52 will move the pair of wheels 22 via the linking bars 28 and linkages 26 between a retracted position and an extended position. The stationary block 54 is fixedly mounted on the pair of vertical bars 12. A respective compression spring 56 can be additionally provided between the blocks 52 and 54, telescoping the vertical bars 12, to assist in moving the block 52 away from the block 54 when the movable block 52 is released or permitted to perform such a movement.

Figure 3:
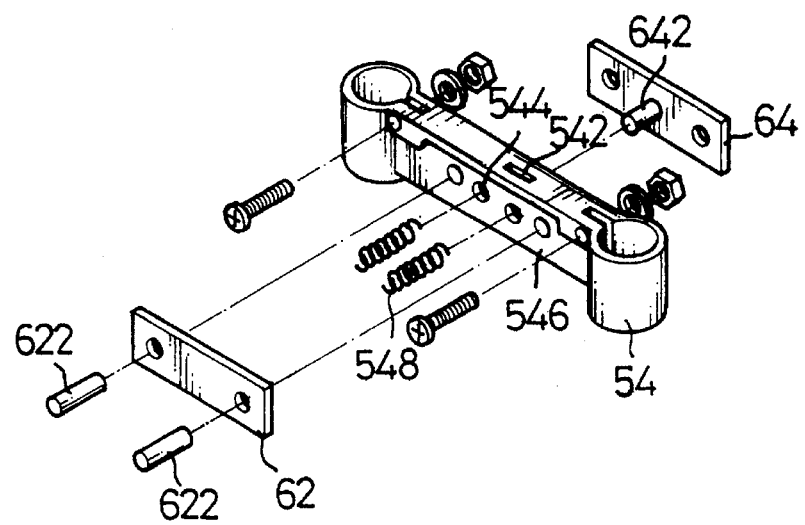
FIG. 3 shows a biasing unit, in exploded view, for use in the trolley of the invention and a stationary block.
Figure 4:
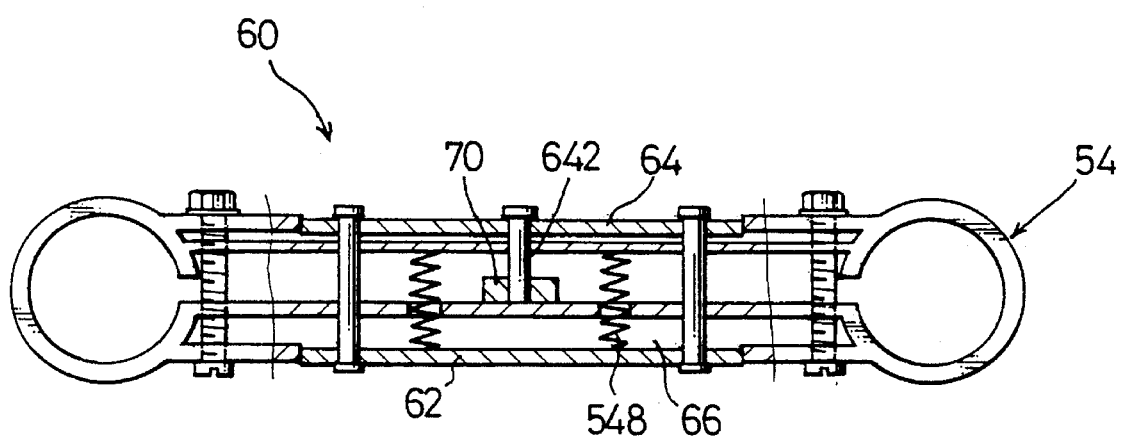
FIG. 4 is a cross-sectional view taken along line 4—4 in FIG. 2 showing the biasing unit assembled on the stationary block.

FIGS. 3 and 4 show the biasing unit 60 in an exploded view and an assembled cross-sectional view, respectively. The biasing unit 60 comprises a first piece 62 and a second piece 64. In use, the two pieces 62 and 64 are fixedly connected together by suitable fastening means such as rivets 622 and are retained at a spaced apart relationship on the block 54 with each piece being positioned at a respective lateral side of the stationary block 54. The second piece 64 has a pin 642 protruding into the stationary block 54 (see FIG. 4). A longitudinal slot 542 is formed on the stationary block 54. At least one bore 544 and preferably two are laterally provided at a wall 546 facing the first piece 62. A respective spring 548 is received within each bore 544 for urging the first piece 62 away from the block 54. Since the two pieces 62 and 64 are secured together, this movement will bring the second piece 64 to come closer to the block 54.

Figure 2:
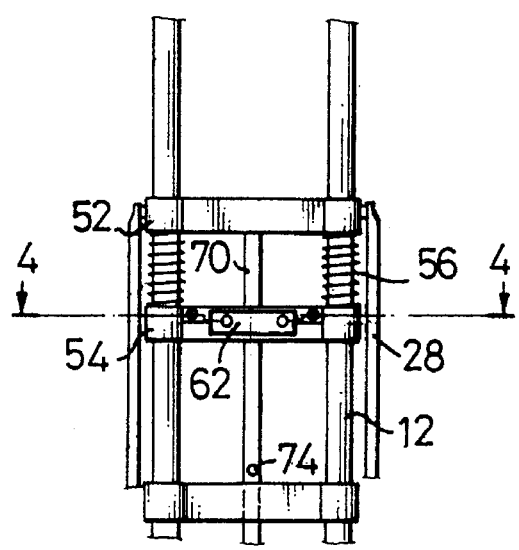
FIG. 2 is a fragmentary view particularly showing a movable block in a position which corresponds to a retracted position of the wheels.

A positioning plate 70 is fixedly attached on the movable block 52 (see FIGS. 1 and 2). The positioning plate can pass through the longitudinal slot 542 of the block 54 and has a number of lateral holes thereon, two lateral holes 72 and 74 being visible in FIG. 1 and FIG. 2, respectively.

FIG. 4 shows that the pin 642 engages with one hole 72 or 74 of the positioning plate 70 under the aid of the spring force urging the first and second pieces 62 and 64 so that the plate 70 and therefore the movable block 52 is locked from movement. The distance between the two lateral side walls of the stationary block 54 is smaller than the distance between the two pieces 62 and 64 to such an extent that a gap 66 is defined between the first piece 62 and the facing wall 546 of the block 54 when the biasing unit 60 is urged by springs 548 bearing against an inside face of the block 54. To disengage the pin 642 of the second piece 64 from the positioning plate 70, manual operation of applying an upward force (as view in the direction of FIG. 4) against the force of springs 548 is required. In this way, the biasing unit 60 cooperates with the positioning plate 70 to control a sliding movement of the movable block 52 relative to the frame of the trolley.

It is desired that upon disengaging the pin 642 from the second piece 64, the wheel assembly 20 will be brought to an extended position under the action of a gravity force on the trolley. This is done by the aid of the compression spring 56 disposed on each vertical bar 12 and acted to urge the movable block 52 away from the stationary block 54.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. For use in a trolley comprising a pair of vertical bars, wheel means connected to the pair of vertical bars, and a pair of linking bars for effectuating a pivotal movement of a pair of wheels of the wheel means relative to the pair of vertical bars, the improvement comprising the provision of an actuation device between the pair of linking bars and the pair of vertical bars, said actuation device comprising:

a movable block linked to the linking bars and slidable on the pair of vertical bars;

a stationary block fixedly mounted on the pair of vertical bars;

a positioning plate fixedly attached on said movable block, said positioning plate having at least two lateral holes therein;

a longitudinal slot disposed on said stationary block and permitting said positioning plate to pass through; and a biasing unit mounted on said stationary block, said biasing unit having a pin protruding into said stationary block, said pin being engageable with each of said holes on said positioning plate, said biasing unit being manually laterally operable to effectuate a lateral movement to thereby engage and disengage said protruding pin with and from said holes.

2. The actuation device as claimed in claim 1, wherein said biasing unit comprises:

a first piece and a second piece being retained at a spaced apart relationship at both lateral sides of said stationary block;

at least one bore laterally provided at a midway on said stationary block; and a spring being received within said at least one bore for urging said first and second pieces at a locking position where said pin engages one of said holes of said positioning plate.

3. The actuation device as claimed in claim 1, further comprising a respective compression spring telescoping each vertical bar and compressed between said movable and stationary blocks to facilitate a sliding movement of said movable block away from said stationary block.

4. A trolley comprising:

a frame having a pair of vertical bars;

a pair of wheel assemblies each being pivotally connected to said frame;

a pair of linking bars each having a first end linked to a corresponding wheel assembly; and means for bringing said pair of wheel assemblies into an extended position under the action of a gravity force on the trolley, said means for bringing comprising:

a movable block connected to a second end of each linking bar, said movable block being slidable relative to said frame to bring said pair of wheel assemblies into said extended position via said pair of linking bars, said movable block comprising a positioning plate fixed thereto;

a compression spring disposed on each vertical bar between said movable block and said frame for further urging said movable blocks along said vertical bars; and a biasing unit mounted on said frame, said biasing unit cooperating with said positioning plate to control a slidable movement of said movable block relative to said frame, said biasing unit comprising:

a first and a second pieces being retained at a spaced apart relationship at both lateral sides of said stationary block;

a pin fixed to one of the first and second pieces and protruding into said stationary block;

at least one bore laterally provided at a midway on said stationary block; and a spring being received within said at least one bore for urging said first and second pieces, thereby moving said pin to engage said positioning plate.

5. A trolley comprising:

a frame having a pair of vertical bars;

a pair of wheel assemblies each being pivotally connected to said frame;

a pair of linking bars each having a first end linked to a corresponding wheel assembly;

a sliding means being connected to respective second end of each linking bar and being movable along said pair of vertical bars to effectuate a pivotal movement of said pair of wheels assemblies relative to said frame, said sliding means comprising a movable block and a positioning plate fixedly secured to and extending from said movable block, said positioning plate having at least two lateral holes therein; and means for releasably positioning said sliding means on said pair of vertical bars, said means for releasably positioning comprising:

a stationary block fixedly mounted to said frame;

a first and a second pieces being retained at a spaced apart relationship at both lateral sides of said stationary block;

a pin fixed to one of the first and second pieces and protruding into said stationary block;

at least one bore laterally provided at a midway on said stationary block; and a spring being received within said at least one bore for urging said first and second pieces at a locking position where said pin engages one of said holes of said positioning plate.

6. The trolley as claimed in claim 5, wherein said first and second pieces are manipulatable against a force applied by said spring to disengage said pin from said hole.

7. The trolley as claimed in claim 5, further comprising a compression spring between said movable and stationary blocks, said compression spring forcing said movable block away from said stationary block upon disengagement of said pin from said hole.

* * * * *